(12) United States Patent
Gamishev

(10) Patent No.: US 11,895,487 B2
(45) Date of Patent: Feb. 6, 2024

(54) METHOD FOR DETERMINING A KEY FOR SECURING COMMUNICATION BETWEEN A USER APPARATUS AND AN APPLICATION SERVER

(71) Applicant: ORANGE, Issy-les-Moulineaux (FR)

(72) Inventor: Todor Gamishev, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 149 days.

(21) Appl. No.: 16/962,329

(22) PCT Filed: Jan. 11, 2019

(86) PCT No.: PCT/FR2019/050056
§ 371 (c)(1),
(2) Date: Jul. 15, 2020

(87) PCT Pub. No.: WO2019/141924
PCT Pub. Date: Jul. 25, 2019

(65) Prior Publication Data
US 2020/0344603 A1    Oct. 29, 2020

(30) Foreign Application Priority Data

Jan. 19, 2018 (FR) ...................... 1850440

(51) Int. Cl.
*H04W 12/0431* (2021.01)
*H04W 12/06* (2021.01)
*H04W 12/041* (2021.01)

(52) U.S. Cl.
CPC ..... *H04W 12/0431* (2021.01); *H04W 12/041* (2021.01); *H04W 12/06* (2013.01)

(58) Field of Classification Search
CPC ............... H04W 12/04; H04W 12/041; H04W 12/0431; H04W 12/06
See application file for complete search history.

(56) References Cited

U.S. PATENT DOCUMENTS 8,296,836 B2 * 10/2012 Kolesnikov ........... H04W 12/06
  726/9
8,880,873 B2 * 11/2014 Lu ........................... H04L 63/08
  713/168

(Continued)

FOREIGN PATENT DOCUMENTS

EP    2037620 A1    3/2009

OTHER PUBLICATIONS

J. H. Lee and D. H. Lee, "Efficient and Secure Remote Authenticated Key Agreement Scheme for Multi-server Using Mobile Equipment," 2008 Digest of Technical Papers—International Conference on Consumer Electronics, Las Vegas, NV, USA, 2008, pp. 1-2. (Year: 2008).*

(Continued)

*Primary Examiner* — Kari L Schmidt
(74) *Attorney, Agent, or Firm* — David D. Brush; Westman, Champlin & Koehler, P.A.

(57) ABSTRACT

A method for determining a key for securing communication between a user apparatus and an application server. An authentication server of a mobile communication network and the user apparatus generate a secret master key during an authentication procedure. The user apparatus sends the authentication server a request for a key to communicate with the application server and receives a random variable. The authentication server and the user apparatus calculate the requested key by using a key derivation function applied to at least the random variable, a user identifier and an application server identifier using the master key.

12 Claims, 2 Drawing Sheets

(56) References Cited

U.S. PATENT DOCUMENTS

| | | | | |
|---|---|---|---|---|
| 8,893,244 | B2* | 11/2014 | Counterman | H04W 12/06 713/168 |
| 2006/0149972 | A1* | 7/2006 | Deng | G06F 21/6227 713/193 |
| 2006/0171541 | A1* | 8/2006 | Horn | H04L 9/0838 380/278 |
| 2006/0174117 | A1* | 8/2006 | Laitinen | H04L 9/3271 713/169 |
| 2007/0101122 | A1* | 5/2007 | Guo | H04L 9/0844 713/153 |
| 2008/0095362 | A1* | 4/2008 | Blom | H04L 9/321 380/45 |
| 2008/0273704 | A1* | 11/2008 | Norrman | H04L 63/08 380/278 |
| 2009/0013356 | A1* | 1/2009 | Doerr | H04N 21/41407 725/62 |
| 2009/0068988 | A1* | 3/2009 | Cofta | H04L 63/0853 455/411 |
| 2009/0117877 | A1* | 5/2009 | Yang | H04W 12/0431 455/411 |
| 2009/0132806 | A1* | 5/2009 | Blommaert | H04W 12/0431 713/171 |
| 2009/0307483 | A1* | 12/2009 | Falk | H04L 63/062 713/153 |
| 2012/0263298 | A1* | 10/2012 | Suh | H04W 4/50 380/255 |
| 2013/0046971 | A1* | 2/2013 | Lu | H04L 65/1063 713/168 |
| 2013/0315393 | A1* | 11/2013 | Wang | H04W 12/06 380/270 |
| 2014/0040628 | A1* | 2/2014 | Fort | G09C 5/00 713/182 |
| 2014/0215217 | A1* | 7/2014 | Gronowski | H04L 63/083 713/171 |
| 2014/0344578 | A1* | 11/2014 | Kim | H04W 12/037 713/168 |
| 2015/0149776 | A1* | 5/2015 | Chastain | H04L 63/061 713/168 |
| 2015/0189507 | A1 | 7/2015 | Bournelle et al. | |
| 2015/0302057 | A1* | 10/2015 | Kealey | H04L 9/30 707/768 |
| 2016/0029213 | A1* | 1/2016 | Rajadurai | H04W 12/0433 380/283 |
| 2016/0094988 | A1* | 3/2016 | Lee | H04L 9/0825 380/270 |
| 2016/0127903 | A1* | 5/2016 | Lee | H04W 36/0038 713/168 |
| 2016/0262015 | A1* | 9/2016 | Lee | H04W 12/02 |
| 2016/0262021 | A1* | 9/2016 | Lee | H04W 12/06 |
| 2016/0277927 | A1* | 9/2016 | Lee | H04W 76/11 |
| 2016/0295406 | A1* | 10/2016 | Agiwal | H04W 76/23 |
| 2017/0026371 | A1* | 1/2017 | Holtmanns | H04W 12/04 |
| 2018/0020351 | A1* | 1/2018 | Lee | H04W 12/04 |
| 2018/0084414 | A1* | 3/2018 | Lee | H04W 12/0433 |
| 2018/0124601 | A1* | 5/2018 | Vutukuri | H04W 48/14 |
| 2019/0028474 | A1* | 1/2019 | Chen | H04L 63/0884 |
| 2019/0149545 | A1* | 5/2019 | Arora | H04L 9/006 726/7 |
| 2019/0313216 | A1* | 10/2019 | Wong | H04L 12/66 |
| 2020/0221297 | A1* | 7/2020 | Hu | H04L 9/3242 |
| 2022/0086632 | A1* | 3/2022 | Wang | H04W 12/069 |
| 2022/0191043 | A1* | 6/2022 | Ying | H04L 9/0869 |
| 2023/0057968 | A1* | 2/2023 | Sharma | H04L 63/164 |

OTHER PUBLICATIONS

M. Ouaissa, A. Rhattoy and I. Chana, "New Security Level of Authentication and Key Agreement Protocol for the IoT on LTE Mobile Networks," 2018 6th International Conference on Wireless Networks and Mobile Communications (WINCOM), Marrakesh, Morocco, 2018, pp. 1-.6. (Year: 2018).*

English translation of the Written Opinion of the International Searching Authority dated Jul. 21, 2020 for corresponding International Application No. PCT/FR2019/050056, filed Jan. 11, 2019.

"3rd Generation Partnership Project, Technical Specification Group Services and System Aspects; Generic Authentication Architecture (GAA); Generic Bootstrapping Architecture (GBA) (Release 15)", 3GPP Standard; Technical Specification; 3GPP TS 33.220, 3rd Generation Partnership Project (3GPP), Mobile Competence Centre; 650, Route Des Lucioles; F-06921 Sophia-Antipolis Cedex; France, vol. SA WG3, No. V15.1.0, Jan. 4, 2018 (Jan. 4, 2018), pp. 1-93, XP051392345.

International Search Report dated Feb. 22, 2019 for corresponding International Application No. PCT/ FR2019/050056, filed Jan. 11, 2019.

Written Opinion of the International Searching Authority dated Feb. 22, 2019 for corresponding International Application No. PCT/ FR2019/050056, filed Jan. 11, 2019.

* cited by examiner

METHOD FOR DETERMINING A KEY FOR SECURING COMMUNICATION BETWEEN A USER APPARATUS AND AN APPLICATION SERVER

CROSS-REFERENCE TO RELATED APPLICATIONS

This application is a Section 371 National Stage Application of International Application No. PCT/FR2019/050056, filed Jan. 11, 2019, the content of which is incorporated herein by reference in its entirety, and published as WO 2019/141924 on Jul. 25, 2019, not in English.

FIELD OF THE DISCLOSURE

The invention relates to the general field of telecommunications.

The invention more particularly relates to a technique for determining a key intended to make a communication between a user equipment and an application server secure.

The technique for determining a key is applicable to the field of mobile communication networks.

BACKGROUND OF THE DISCLOSURE

In order to allow a user equipment UE (also referred to as a terminal) to communicate securely with an application server, an architecture referred to as the generic bootstrapping architecture (GBA) has been defined by the 3GPP standardization organization, in the context of a mobile network, a fourth-generation mobile network for example. This architecture is defined in the technical specification referenced 3GPP TS 33.220 version V15.1.0, entitled "Generic Authentication Architecture (GAA); Generic Bootstrapping Architecture (GBA) (Release 15)". In GBA, provision is made for a bootstrapping server function (BSF), which performs an authentication of the terminal and allows a master key Ks associated with a bootstrapping transaction identifier B_TID to be defined. Once this master key Ks has been defined, the terminal and the BSF derive a key Ks_NAF from the master key Ks in order to make exchanges with the application server NAF secure. More precisely, this key Ks_NAF is derived from the master key Ks by applying a key derivation function KDF to key derivation parameters. These parameters in particular comprise an identifier NAF_Id of the application server and the random number RAND used in the authentication. At the end of these actions, the terminal and the BSF share a key Ks_NAF intended to be used to make exchanges between the terminal and the application server NAF secure. The application server NAF then requests the key Ks_NAF associated with the transaction identifier B_TID from the BSF. The terminal and the application server NAF may then communicate securely by means of the key Ks_NAF.

The operator of the mobile network is, in this context, an intermediary that uses the secrets shared between the home subscriber system (HSS) and the secure module of the terminal to guarantee the security of the link between the application server NAF and the terminal UE without these two entities needing to share a secret.

The introduction of such a GBA into the network of a mobile operator results in substantial costs, in particular due to the introduction of the BSF and to the interfacing thereof with the mobile network.

Moreover, provision has not currently been made for a function similar to this GBA function in fifth-generation (5G) mobile networks, which are in the process of being standardized by the 3GPP organization.

SUMMARY

One of the aims of the invention is to remedy insufficiencies/drawbacks of the prior art, and/or to provide improvements thereto.

According to a first aspect, one subject of the invention is a method for determining a key intended to make a communication between a user equipment and an application server secure. The method comprises, in the user equipment:
an authentication of the user equipment by an authentication server of a mobile communication network, a secret master key being generated, during said authentication, by the user equipment and the authentication server;
sending by the user equipment, to the authentication server a key request with a view to communicating with the application server;
computing said key by means of a key derivation function applied to at least a random variable, a user identifier and an identifier of the application server and using the master key, said random variable having been received by the user equipment from the authentication server.

Correspondingly, the method for determining a key intended to make a communication between a user equipment and an application server secure comprises, in the authentication server:
an authentication of the user equipment by an authentication server of a mobile communication network, a secret master key being generated, during said authentication, by the user equipment and the authentication server;
receiving by the authentication server a key request that was sent by the user equipment with a view to communicating with the application server;
sending a random variable by the authentication server to the user equipment;
computing said key by means of a key derivation function applied to at least the random variable, a user identifier and an identifier of the application server and using the master key.

By virtue of this technique, the key allowing a communication between the user equipment and the application server to be made secure is derived from a master key generated during an authentication performed by the authentication server of the mobile communication network. The technique is thus implemented by an authentication server that is already integrated into and therefore interfaced with the mobile communication network, and in particular with the server that manages user data. It is not necessary to provide a specialized server, i.e. what is referred to as a bootstrapping server, to determine this key. In addition, the key is computed independently of the authentication: a random variable is used to compute the key independently of that used for the authentication. The master key and the derived key are thus decoupled, distinct random variables having been used. It is thus possible to derive as many keys as required, provided that the master key has not expired. Once the key has been derived, the latter remains valid even if the master key is modified. A secure communication by means of the computed key may then be set up between the user equipment and the application server.

The various embodiments or features mentioned below may be added independently or in combination with one another to the method such as defined above for determining a key.

In one particular embodiment, the authentication server delivers to the application server the key that it computed.

In one particular embodiment of the method for determining a key, this authentication is triggered during registration of the user equipment with the mobile communication network.

The proposed technique thus takes advantage of the authentication that was performed during the registration of the user equipment with the mobile communication network. Specifically, in the authentication procedure currently in the process of standardization by the organization 3GPP for fifth-generation (5G) systems, which procedure is defined in the 3GPP specification document TS 33.501 V0.6.0 (2017-12) "Security Architecture and Procedures for 5G System (Release 15)", a master key $K_{AUSF}$ is determined by the user equipment and the server implementing the authentication server function (AUSF). For an EAP-AKA' authentication, the master key $K_{AUSF}$ is determined from an extended master session key (EMSK). For a 5G AKA authentication, the master key $K_{AUSF}$ is derived from encryption and integrity keys. In its current version, and in particular in paragraph 6.2.2.1, specification document TS 33.501 indicates that the authentication server is able to store this master key $K_{AUSF}$, which is generated between the authentication procedure and the procedures carried out between entities of the mobile communication network and the user equipment to agree keys, in memory. The same specification document also indicates, in paragraph 6.2.1, in an editor's note, that when the authentication server stores this master key $K_{AUSF}$ in memory, whether or not the user equipment needs to store it in memory is a subject for future study. It will be understood that, to implement the proposed determining technique, the master key $K_{AUSF}$ must be stored in memory both by the authentication server and by the user equipment. Since this master key $K_{AUSF}$ is used to derive a key intended to make a communication between a user equipment and an application server secure, it is not necessary to perform a new authentication procedure specific to this communication with the application server, unlike in the current GBA procedure where a new authentication procedure is required. There is therefore no need to solicit the secure element of the user equipment each time the user equipment desires to communicate with an application server. This technique is also simple to implement in a 5G mobile communication network, in so far as it is enough to integrate a new service into the authentication server. The latter then exposes this new service and may be contacted by an application server to determine the key intended to make a communication between the user equipment and the application server secure.

In one particular embodiment of the determining method, the user equipment sends, to the application server, an access request and receives, from the application server, a proof prepared by the authentication server and intended for the user equipment, whether or not the key request is sent depending on a verification of said proof by the user equipment.

Correspondingly, the authentication server delivers to the application server a prepared proof intended for the user equipment, said proof being intended to be sent, by the application server, to the user equipment in response to an access request sent by the user equipment, whether or not the key request is sent to the authentication server depending on a verification of said proof by the user equipment.

This proof is for example contained in an authentication token. This proof, which is prepared by the authentication server and delivered by the application server to the user equipment, allows the latter to verify that the application server is indeed authorized and to do so before any key derivation is performed in the user equipment. In the current GBA procedure, the user equipment derives the key even before ensuring that the application server is authorized. The latter may not have been authorized by the BSF server and may thus not have the derived key available to it.

Correspondingly, after an access request has been received from the user equipment, the application server receives a prepared proof intended for the user equipment and sends this proof to the user equipment, whether or not the key request is sent to the authentication server depending on a verification of said proof by the user equipment.

In one particular embodiment, the authentication server verifies that it has computed a key intended to make a communication between said user equipment and said application server secure, whether or not the random variable is sent to the user equipment depending on said verification.

Thus, the user equipment does not derive the key when the application server has not solicited beforehand the authentication server for this user equipment.

According to a second aspect, the invention relates to a user equipment, arranged to communicate with an application server via a mobile communication network, said equipment comprising:
  an authentication module allowing an authentication server of the mobile communication network to perform an authentication of the user equipment, a secret master key being generated, during said authentication, by the user equipment and the authentication server;
  a send module allowing the user equipment to send, to the authentication server, a key request with a view to communicating with the application server;
  a computing module allowing a key intended to make a communication between the user equipment and the application server secure to be computed by means of a key derivation function applied to at least a random variable, a user identifier and an identifier of the application server and using the master key, said random variable having been received by the user equipment from the authentication server.

The advantages mentioned with respect to the method for determining a key according to the first aspect are directly transposable to the user equipment.

This user equipment may of course comprise, in structural terms, the various features of the method such as described above for determining a key, which features may be combined or implemented individually.

According to a third aspect, the invention relates to an authentication server of a mobile communication network, this authentication server comprising:
  an authentication module, arranged to perform an authentication of a user equipment, a secret master key being generated, during said authentication, by the user equipment and the authentication server;
  a receive module for receiving a key request that was sent by the user equipment with a view to communicating with an application server;
  a send module allowing the authentication server to send a random variable to the user equipment;
  a computing module for computing a key intended to make a communication between the user equipment and the application server secure, said key being computed by means of a key derivation function applied to at least the random variable, a user identifier and an identifier of the application server and using the master key.

The advantages mentioned with respect to the method for determining a key according to the first aspect are directly transposable to the authentication server.

This authentication server may of course comprise, in structural terms, the various features of the method such as described above for determining a key, which features may be combined or implemented individually.

According to a fourth aspect, the invention relates to a system for determining a key intended to make a communication between a user equipment and an application server secure, this system comprising at least a user equipment according to the second aspect and an authentication server according to the third aspect.

The advantages mentioned with respect to the method for determining a key according to the first aspect are directly transposable to the system for determining a key.

In one particular embodiment, the system furthermore comprises the application server, said application server comprising a communication module, arranged to receive said key from the authentication server.

According to a fifth aspect, the invention relates to a program for a user equipment, containing program-code instructions intended to command the execution of those of the steps of the method for determining a key described above that are implemented by the user equipment when this program is executed by this equipment and a storage medium that is readable by a user equipment, on which is stored a program for a user equipment.

The advantages mentioned with respect to the method for determining a key according to the first aspect are directly transposable to the program for a user equipment and to the storage medium.

According to a sixth aspect, the invention relates to a program for an authentication server, containing program-code instructions intended to command the execution of those of the steps of the method for determining a key described above that are implemented by the authentication server when this program is executed by this server and a storage medium that is readable by a server, on which is stored a program for a server.

The advantages mentioned with respect to the method for determining a key according to the first aspect are directly transposable to the program for an authentication server and to the storage medium.

BRIEF DESCRIPTION OF THE DRAWINGS

The technique for determining a key intended to make a communication between a user equipment and an application server secure will be better understood by virtue of the following description of particular embodiments, which is given with reference to the appended drawings, in which:

FIG. 5 shows an application server according to one particular embodiment.

DETAILED DESCRIPTION OF ILLUSTRATIVE EMBODIMENTS

Figure 1:
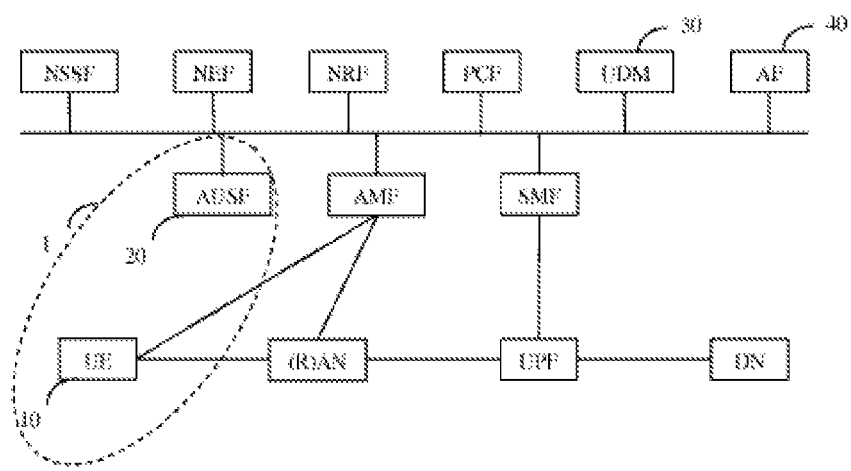
FIG. 1 shows a mobile communication network in which the method for determining a key according to one particular embodiment is implemented.

FIG. 1 shows a mobile communication network in which the method for determining a key according to one particular embodiment is implemented.

FIG. 1 shows the architecture of a fifth-generation (5G) system in a mobile communication network in the process of being standardized, in a case where the user equipment is in its nominal network. It corresponds to figure 4.2.3-1 of the 3GPP specification document TS 23.501 V2.0.1 (2017-12), entitled "System Architecture for the 5G System; Stage 2 (Release 15)". This 5G system architecture comprises a plurality of network functions, which are more particularly described functionally in section 6 of this specification document TS 23.501. The various acronyms of these network functions are given in the appendix. Only network functions that contribute to the implementation of the method for determining a key $K_{AF}$ intended to make a communication between a user equipment UE and an application server AF (AF standing for application function) secure are described in detail below.

Thus, with reference to FIG. 1, a secure communication must be set up between a user equipment 10 and an application server 40 in order to implement an application.

A user equipment UE (also referred to as a terminal) is arranged to access a mobile communication network (shown in FIG. 1). In the conventional architecture of such a user equipment, an execution environment comprising an operating system suitable for executing applications of the user, an execution environment responsible for network communications and called the "baseband" and a secure element, are usually distinguished between. This secure element is a universal integrated circuit card (UICC) or an embedded universal integrated circuit card (eUICC). An example of a secure module is a universal subscriber identity module (USIM) inserted into a user equipment and used for mobile telephony. The secure element is arranged to store and process sensitive data, for example an application allowing access to the network and associated authentication data (credentials being spoken of) such as cryptographic algorithms and keys. Such data are intended to be used by a protocol of authentication to the network during access to the latter. No limitation is placed on a user equipment of this type and in another example embodiment the secure element of the user equipment is a secure software region arranged to process the sensitive network-access data. The user equipment is a mobile equipment, for example a smart terminal such as a smart phone, a tablet computer, etc. The user of the user equipment has taken out with an operator a subscription allowing him to access the mobile network of the operator. To this end, the user equipment 10 comprises secure data that form a network-access profile. A network-access profile comprises a set of data that allow the network to be accessed in a secure way. More precisely, the access profile comprises at least one identifier of the user equipment 10, an identifier of the network to which he may access by virtue of his subscription, and data intended to be used during the phase of authentication to the network, such as an authentication key, conventionally denoted K.

The user equipment 10 accesses the network entities via an access network denoted (R)AN in FIG. 1. This access network comprises base stations, which are arranged to manage radio transmission and reception with the user equipment 10.

This 5G system architecture is based on the service. More precisely architecture elements are defined as network functions that provide their services via interfaces to a development infrastructure common to other network functions that are authorized to use them. A network repository function (NRF) allows each network function to discover the services provided by the other network functions. Moreover, the network exposure function (NEF) receives information from other network functions depending on capacities exposed thereby. The NEF stores the received information in memory as data structured by means of a standardized interface with a unified data repository (UDR).

The mobile communication network in particular comprises a unified-data-management (UDM) server, referenced 30. This management server 30 in particular implements the following functionalities:

generation of 3GPP authentication and key agreement (AKA) data;

storage in memory and management of a subscription permanent identifier (SUPI) for each subscriber of the 5G system;

authorization of access depending on subscription data;

management of the registration of the network function for binding the user equipment;

management of the subscription.

The mobile communication network also comprises an authentication server AUSF (for authentication server function), referenced 20, and suitable for authenticating the user equipments.

Conventionally, and for the purpose of accessing the network, the secure module of the user equipment 10 has stored in memory an authentication key, conventionally denoted K, which is shared with the unified-data-management server 30. The authentication key K is intended to be used to generate authentication data and to derive keys such as a key $K_{AUSF}$, $K_{SEAF}$, $K_{AMF}$ and keys for encrypting the signalling, data in the user plane, control of radio resources and so-called intermediate keys. The hierarchy of the keys is for example shown in figure 6.2.1-1 of the 3GPP specification document TS 33.501 V0.6.0 (2017-12) "Security Architecture and Procedures for 5G System (Release 15)". During this authentication procedure a random variable RAND is used.

The master key $K_{AUSF}$ is a secret key shared between the authentication server 20 and the user equipment 10. In the described embodiment, these two devices store this master key $K_{AUSF}$ in memory at the end of an authentication procedure.

For an EAP-AKA' authentication, the master key $K_{AUSF}$ is determined from an extended master session key (EMSK) by the user equipment 10 and the authentication server 20. For more details, paragraph 6.1.3.1 of the document TS 33.501 describes in more detail this EAP-AKA' authentication procedure. For a 5G AKA authentication, the master key $K_{AUSF}$ is determined from CK/IK keys (CK standing for ciphering key and IK for integrity key) by the user equipment 10 and the authentication server 20. The master key $K_{AUSF}$ is derived from the CK/IK keys, such as specified in paragraph A.2 of appendix A of the document TS 33.501, by applying a key derivation function (KDF) to input parameters. For more detail, paragraph 6.1.3.2 of the document TS 33.501 describes in more detail this 5G AKA authentication procedure.

Below, the KDF corresponds to the function specified in the 3GPP specification document TS 33.220 V15.1.0 (2018-01) "Generic Authentication Architecture (GAA); Generic Bootstrapping Architecture (GBA) (Release 15)". This document in particular specifies how to construct, for the KDF, the input string S, which, with the key in question, forms part of the input parameters.

To implement the proposed method, a service UE_AF_comm is exposed by the authentication server 20, which is for example denoted Nausf_UE_AF_comm (request), in addition to the service Nausf_UEAuthentication. Nausf corresponds to the name given to the interface between the authentication server AUSF and the other functions of the network. Likewise, the service UE_AF_comm is exposed by the application server 40, which is for example denoted Naf_UE_AF_comm (UE_ausf_notify). Naf corresponds to the name given to the interface between the application server AF and the other functions of the network. The services exposed by the various network functions are detailed in 3GPP specification document TS 23.502 V2.0.0 (2017-12) "Procedures for the 5G System; Stage 2 (Release 15)".

The application server 40 may either be managed by the operator of the mobile communication network or by a third party.

A system 1 for determining a key intended to make a communication between a user equipment and an application server secure comprises at least a user equipment 10 and an authentication server 20.

In one particular embodiment, the system 1 furthermore comprises the application server 40.

Figure 2:
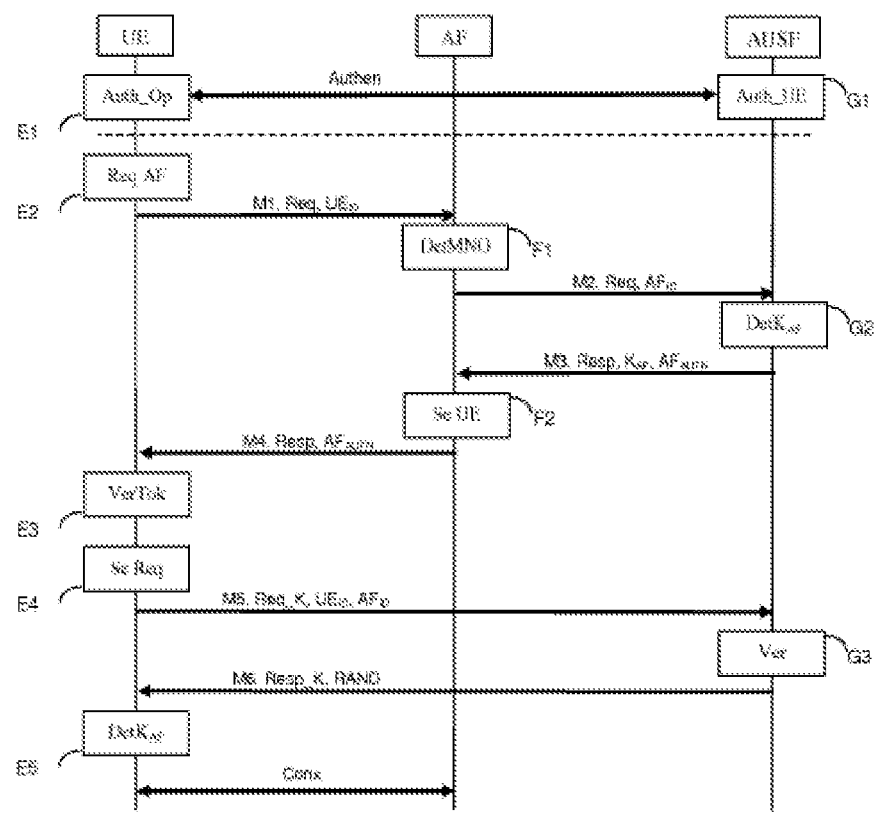
FIG. 2 illustrates steps of a method for determining a key intended to make a communication between a user equipment and an application server secure according to one particular embodiment.

The method for determining a key intended to make a communication between a user equipment and an application server secure, which method is implemented by the user equipment 10, the application server 40 and the authentication server 20, will now be described with reference to FIG. 2.

Below, the context is that of a 5G mobile communication network such as described above.

An authentication procedure is implemented by the user equipment 10 in a step E1 and by the authentication server 20 in a step G1 during a registration of the user equipment to the mobile communication network. During this authentication procedure, a secret master key $K_{AUSF}$ is generated by the user equipment 10 and the authentication server 20 from a random variable RAND1. At the end of step E1, the user equipment 10 stores in a storage memory 105 the generated master key $K_{AUSF}$. Correspondingly, at the end of step G1, the authentication server 20 stores in a storage memory 205 the generated master key $K_{AUSF}$.

The user equipment 10 sends, in a step E2, to the application server 40, an access request M1. This access request M1 in particular comprises:

information allowing the communication network to be identified (for example the mobile country code (MCC) and the mobile network code (MNC)), an identifier of the user equipment 10 $UE_{ID}$, which will have been provided beforehand by the operator of the communication network.

This identifier $UE_{ID}$ is different from the subscription identifier SUPI but the network operator is arranged to associate this user identifier $UE_{ID}$ with the subscription identifier SUPI for a given connection. This user identifier $UE_{ID}$ is in one particular embodiment allocated by the network operator.

In one particular embodiment, the user identifier $UE_{ID}$ comprises information allowing the communication network to be identified.

By way of illustration, the identifier $UE_{ID}$ takes the form surname.forename@orange.fr. Such an identifier allows the user equipment to be identified and the operator Orange to be identified. It is then possible to deduce therefrom the network identifier MCC 208 and MNC 01.

This message M1 is received by the application server 40 in a step F1. Still during this step the application server 40 determines the network identifier and sends a request M2 to the authentication server 20 of the communication network of the identified operator, via the server responsible for the NEF where appropriate. This request M2 in particular comprises an application-server identifier $AF_{ID}$ and optionally a required duration of validity $ExpireTime_{AF}$. The identifier application-server $AF_{ID}$ for example corresponds to "service.fr".

This request M2 is received by the authentication server 20 in a step G2. Still in this step G2, the authentication server 20 computes a key $K_{AF}$ intended to make the communication between the user equipment 10 and the application server 40 secure by means of the KDF applied on the basis of the master key $K_{AUSF}$. The input string S in particular comprises the user identifier $UE_{ID}$, a duration of validity $ExpireTime_{AUSF}$, an identifier $AF_{ID}$ of the application server and a random variable RAND2. The latter is chosen by the authentication server 20 and is unrelated to the random variable RAND1 used in the authentication procedure. The duration of validity $ExpireTime_{AUSF}$ is determined by the authentication server 20.

Still in this step G2, the authentication server 20 prepares an authentication token $AF_{AUTN}$, comprising the application-server identifier $AF_{ID}$ and a proof P intended for the user equipment. This proof P corresponds to the result of a function f using as input the master key $K_{AUSF}$, the application-server identifier $AF_{ID}$ and the duration of validity $ExpireTime_{AUSF}$:

$$P=f(K_{AUSF},AF_{ID},ExpireTime_{AUSF}).$$

This function f is chosen so as to protect against replay.

Thus, the authentication token $AF_{AUTN}$ corresponds to $AF_{ID}\|f(K_{AUSF}, AF_{ID}, ExpireTime_{AUSF})$, where $\|$ corresponds to the concatenation operator. In this authentication token, the application-server identifier $AF_{ID}$ is cleartext.

The authentication server 20 then stores in memory, in association with the master key $K_{AUSF}$ and the subscription identifier SUPI, in particular the user identifier $UE_{ID}$ and the application-server identifier $AF_{ID}$.

Next, the authentication server 20 notifies the application server 40, via a message M3 containing the key $K_{AF}$ and the authentication token $AF_{AUTN}$. Thus, the authentication server 20 delivers, to the application server 40, the computed key $K_{AF}$ and the proof prepared for the user equipment 10, this proof being intended to be sent, by the application server 40, to the user equipment 10 in response to the access request M1 sent by the user equipment. In one particular embodiment, the message M3 comprises the duration of validity $ExpireTime_{AUSF}$.

This message M3 is received by the application server 40 in a step F2. In one particular embodiment, the application server 40 derives two keys, $K_{AFenc}$ for the encryption and $K_{AFint}$ for integrity protection, from $K_{AF}$.

In this step F2, the application server 40 sends a message M4 to the user equipment 10 in response to the access request M1 received in step F1. This message M4 in particular comprises the authentication token $AF_{AUTN}$ and, where appropriate, the duration of validity $ExpireTime_{AUSF}$. It will be noted here that the exchanges between the user equipment 10 and the application server 40 are protected by network keys, because the user equipment 10 is authenticated to the network.

In a step E3, the user equipment 10 receives the message M4 and verifies the proof of the authentication token $AF_{AUTN}$. This proof allows the user equipment 10 to verify that the identified application server 40 has indeed communicated with the authentication server 20 and that it indeed has the key $K_{AF}$ available to it. This makes it possible to verify that the application server 40 is indeed authorized and to do so before any key derivation is carried out in the user equipment 10. Whether or not the request for the key $K_{AF}$ is sent to the authentication server 20 depends on the verification of the proof by the user equipment 10.

When the proof is not verified conform, the user equipment 10 terminates the method for determining a key $K_{AF}$.

When the proof is verified conform, in a step E4, the user equipment 10 sends, to the authentication server 20, a message M5 requesting a key with a view to communicating with the application server 40. This message M5 in particular comprises its user identifier $UE_{ID}$ and the application-server identifier $AF_{ID}$. It will be noted here that the exchanges between the user equipment 10 and the authentication server 20 are protected by network keys, because the user equipment 10 is authenticated to the network.

This key-request message M5 is received by the authentication server 20 in a step G3. The authentication server then verifies whether it has already computed a key $K_{AF}$ intended to make the communication between the user equipment 10 and the application server 40 secure by virtue of information stored in memory in step G2. Whether or not the random variable RAND2 is sent to the user equipment 10 depends on this verification. When the verification is negative, the authentication server 20 terminates the method for determining a key. When the verification is positive, the authentication server 20 sends a response message M6 to the user equipment 10. This message M6 in particular comprises the user identifier $UE_{ID}$, the duration of validity $ExpireTime_{AUSF}$, the application-server identifier $AF_{ID}$ and the random variable RAND2 that was used by the authentication server 20 to compute the key $K_{AF}$.

In a step E5, the user equipment 10 receives the message M6 and derives the key $K_{AF}$ from the master key $K_{AUSF}$ in the way described in step G2 for the authentication server 20. In one particular embodiment, the user equipment 10 derives two keys, $K_{AFenc}$ for the encryption and $K_{AFint}$ for integrity protection, from the key $K_{AF}$.

Thus, at the end of this step E5, the user equipment 10 has computed a key $K_{AF}$ intended to make a communication with the application server 40 secure. The latter also has this key $K_{AF}$, which was obtained from the authentication server, available to it. This key was determined without a new authentication being required, and therefore without soliciting the secure element of the user equipment again.

A communication is then established between the user equipment 10 and the application server 40, which communication is made secure by means of the key $K_{AF}$, limited where appropriate by the duration of validity $ExpireTime_{AUSF}$. Thus, this determining method may be integrated into a method for establishing a secure communication between a user equipment and an application server.

If the master key $K_{AUSF}$ is modified following a new authentication, this has no impact on the secure communication because the key $K_{AF}$ is decoupled from the master key $K_{AUSF}$.

A key $K_{AF}$ may thus be determined for each communication with an application server.

This service is easily integrated into the authentication server and the application server because of the new 5G architecture, which is service-based. A new service Nausf_UE_AF_comm(request) is created in the authentication server. The method is thus based on an existing authentication server that is therefore already integrated into the network of the operator. This method may thus be implemented more easily than the prior-art GBA technique. This method is also easily implemented in the user equipment. A service NaLUE_AF_comm(UE_ausf_notitfy) is created in the application server. There are no exchanges between the authentication server and the UDM server when implementing the method, the latter being based on an authentication that has already been executed. The cost of deployment of such a method is thus low.

The described embodiment comprises the authentication server preparing a proof intended for the user equipment. This proof is delivered by the application server to the user equipment and verified by the latter. The preparation of such a proof and its verification are not implemented in another particular embodiment.

The described embodiment defines input parameters of the key derivation function. It will be noted here that, in certain embodiments, certain of these parameters may be absent or indeed other parameters may be added.

It will be understood that this technique for determining a key allows the procedure for making a communication between a user equipment and an application server secure to be simplified. Once, the user equipment has been authenticated to the authentication server of its mobile network operator, it is easy to determine this key while removing constraints of the prior-art GBA technique. The integration of this technique into a 5G mobile communication network is also facilitated.

No limitation is placed on these various embodiments and those skilled in the art will be able to define others therefrom allowing this key to be determined, depending on a master key shared between the authentication server and the user equipment, using a random variable distinct from that used in the authentication procedure.

Figure 3:
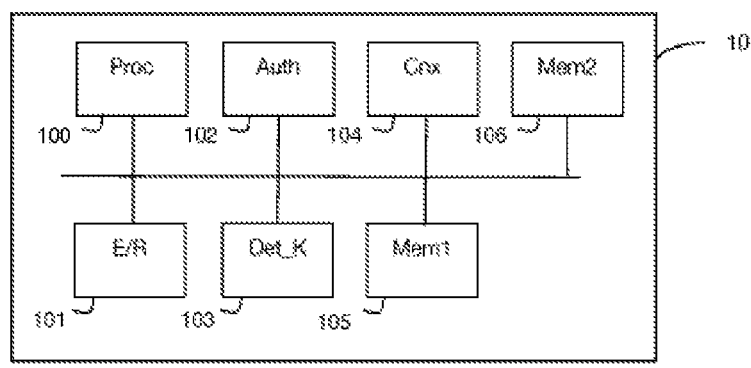
FIG. 3 shows a user equipment according to one particular embodiment.

FIG. 3 schematically illustrates a user equipment 10 in one particular embodiment.

The user equipment 10 in particular comprises:
- a processor 100 for executing software-module code instructions;
- a communication module 101, forming a communication interface with a mobile communication network, arranged to communicate with the devices of a communication network, for example with an authentication server and an application server;
- a memory zone 105, arranged to store a program that contains code instructions for implementing steps of the determining method;
- a storage memory 106, arranged to store data used during the implementation of the determining method;
- a secure element (not shown in FIG. 3).

The user equipment also comprises:
- an authentication module 102 allowing the user equipment to be authenticated by an authentication server 20 of the mobile communication network, a secret master key being generated during said authentication by the user equipment and the authentication server;
- a computing module 103 allowing a key intended to make a communication between the user equipment and the application server secure to be computed by means of a key derivation function applied to at least a random variable, a user identifier and an identifier of the application server and using the master key, said random variable having been received by the user equipment from the authentication server;
- a connection module 104, arranged to set up a secure communication with an application server 40 by means of a key $K_{AF}$.

The communication module 101 is in particular arranged to send, to the authentication server, a key request with a view to communicating with the application server.

The storage memory 106 is in particular arranged to store the master key $K_{AUSF}$ determined during an authentication procedure. In one particular embodiment, this authentication procedure is triggered during a registration of the user equipment with the mobile communication network.

In one particular embodiment, the communication module 101 is in particular arranged to send, to the application server, an access request and to receive, from the application server, a proof prepared by the authentication server and intended for the user equipment. The computing module 103 is then arranged to verify this proof, whether or not the key request is sent depending on this verification.

In one particular embodiment, the computing module 103 is arranged to derive two keys, $K_{AFenc}$ for the encryption and $K_{AFint}$ for integrity protection, from $K_{AF}$.

It will be noted here that the user equipment 10 also comprises other processing modules (not shown in FIG. 3) arranged to perform the various functions of this user equipment.

Figure 4:
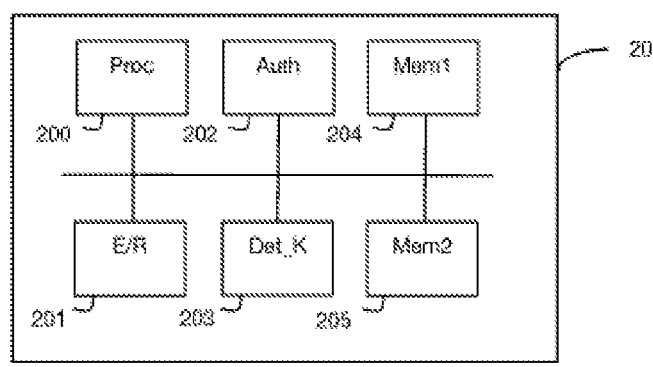
FIG. 4 shows an authentication server according to one particular embodiment.
Figure 3:
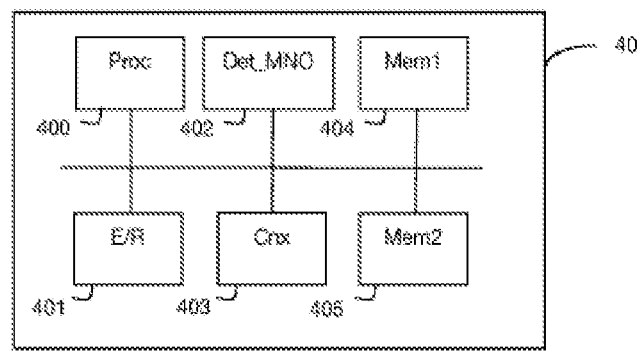

FIG. 4 schematically illustrates an authentication server 20 in one particular embodiment.

The authentication server 20 of a mobile communication network in particular comprises:
- a processor 200 for executing software-module code instructions;
- a communication module 201, which forms a communication interface with respect to a mobile communication network, arranged to communicate with the devices of a communication network, for example with a user equipment and an application server;
- a memory zone 204, arranged to store in memory a program that contains code instructions for implementing steps of the determining method;
- a storage memory 205, arranged to store data used during the implementation of the determining method.

The authentication server 20 also comprises:
- an authentication module 202, arranged to perform an authentication of a user equipment, a secret master key being generated during said authentication by the user equipment and the authentication server;
- a computing model 203 for computing a key intended to make a communication between the user equipment and the application server secure, said key being computed by means of a key derivation function applied to at least a random variable, a user identifier and an identifier of the application server and using the master key.

The communication module 201 is in particular arranged to receive a key request sent by the user equipment with a view to communicating with an application server and with a view to having a random variable sent to the user equipment. The communication module 201 is also arranged to deliver, to the application server, the computed key.

The storage memory 205 is in particular arranged to store the master key $K_{AUSF}$ determined during an authentication procedure. In one particular embodiment, this authentication procedure is triggered during a registration of the user equipment with the mobile communication network.

In one particular embodiment, the computing module 203 is in particular arranged to prepare a proof intended for the user equipment. The communication module 201 is then arranged to deliver this proof to the application server, so that the latter may send it to the user equipment in response to an access request sent by the user equipment, whether or not the key request is sent to the authentication server depending on a verification of this proof as performed by the user equipment.

In one particular embodiment, the storage memory 205 is arranged to store, in association with the master key $K_{AUSF}$ and the subscription identifier SUPI, in particular the user identifier $UE_{ID}$ and the application-server identifier $AF_{ID}$.

In one particular embodiment, the computing module 203 is in particular arranged to verify that it has computed a key intended to make a communication between a user equipment and an application server secure, whether or not the random variable is sent it to the user equipment depending on this verification. This verification in particular comprises a consultation of the storage memory 205.

In one particular embodiment, the authentication server comprises a module arranged to expose the service UE_AF_Comm, as described above.

It will be noted here that the authentication server 20 also comprises other processing modules (not shown in FIG. 4) arranged to perform the various functions of this authentication server.

FIG. 5 schematically illustrates an application server 40 in one particular embodiment.

The application server 40 in particular comprises:
- a processor 400 for executing software-module code instructions;
- a communication module 401, forming a communication interface with a mobile communication network, arranged to communicate with the devices of a communication network, for example with a user equipment and an authentication server;
- a memory zone 404, arranged to store a program that contains code instructions for implementing steps of the determining method;
- a storage memory 405, arranged to store data used during the implementation of the determining method.

The application server 40 also comprises:
- a module 402 for determining a network identifier, arranged to determine, from an access request M1 received from a user equipment, a network identifier;
- a connection module 403, arranged to establish a secure communication with the user equipment 10 by means of a key $K_{AF}$.

The communication module 401 is in particular arranged to receive an access request M1 sent by the user equipment and to send a request M2 to the authentication server 20 of the communication network of the identified operator. The communication module 401 is also arranged to receive a key $K_{AF}$ intended to make a communication with the user equipment secure.

In one particular embodiment, the communication module 401 is arranged to receive, from the authentication server, a prepared proof intended for the user equipment 10 and to send this proof to the user equipment 10 in response to the access request M1 sent by the user equipment.

In one particular embodiment, the application server 40 furthermore comprises a computing module, arranged to derive two keys, $K_{AFenc}$ for the encryption and $K_{AFint}$ for integrity protection, from $K_{AF}$.

In one particular embodiment, the storage memory 405 is arranged to store, in association with the user identifier $UE_{ID}$, the key $K_{AF}$.

In one particular embodiment, the application server comprises a module arranged to expose the service UE_AF_Comm, as described above.

It will be noted here that the application server 40 also comprises other processing modules (not shown in FIG. 5) arranged to perform the various functions of this application server.

The technique for determining a key is implemented by means of software and/or hardware components. In this light, the term "module" may correspond, in this document, either to a software component or to a hardware component or to a set of hardware and/or software components, able to perform a function or a set of functions, in accordance with the description given above with respect to the module in question.

A software component corresponds to one or more computer programs, one or more sub-programs of a program, or more generally to any element of a program or a software package. Such a software component is stored in memory then loaded and executed by a data processor of a physical entity and is capable of accessing the hardware resources of this physical entity (memories, storage media, communication buses, input/output circuit boards, user interfaces, etc.).

In the same way, a hardware component corresponds to any element of a hardware assembly. It may be a question of a programmable or non-programmable hardware component with or without an integrated processor for executing software. It is for example a question of an integrated circuit, of a chip card, of a circuit board for executing firmware, etc.

In one particular embodiment, the modules 101, 102, 103, 104 are arranged to implement steps of the determining method described above that are implemented by the user equipment. It is preferably a question of software modules containing software instructions for making execute those of the steps (or of the actions) of the determining method described above that are implemented by a user equipment. The invention therefore also relates to:
- a program for a user equipment, containing program-code instructions intended to command the execution of those of the steps (or of the actions) of the determining method at was described above, when said program is executed by this user equipment;
- a storage medium that is readable by a user equipment on which the program for an equipment is stored.

In one particular embodiment, the modules 201, 202, 203 are arranged to implement steps of the determining method described above that are implemented by the authentication server. It is preferably a question of software modules containing software instructions for making execute those of the steps (or of the actions) of the determining method described above that are implemented by an authentication server. The invention therefore also relates to:
- a program for an authentication server, containing program-code instructions intended to command the execution of those of the steps (or of the actions) of the determining method described above, when said program is executed by this authentication server;
- a storage medium that is readable by an authentication server on which the program for a server is stored.

In one particular embodiment, the modules 401, 402, 403 are arranged to implement steps of the determining method described above that are implemented by the application server. It is preferably a question of software modules containing software instructions for making execute those of the steps (or of the actions) of the determining method described above that are implemented by an application server. The invention therefore also relates to:

- a program for an application server, containing program-code instructions intended to command the execution of those of the steps (or of the actions) of the determining method described above, when said program is executed by this application server;
- a storage medium that is readable by an application server on which the program for a server is stored.

The software modules may be stored in or transmitted via a data medium. The latter may be a hardware storage medium, for example a CD-ROM, a floppy disk or a hard disk, or indeed a transmission medium such as an electrical, optical or radio signal, or a telecommunication network.

APPENDIX

Authentication Server Function (AUSF)
Access and Mobility Management Function (AMF)
Data Network (DN), for example operator services, an extended access to the communication network or indeed third-party services
Network Exposure Function (NEF)
NF Repository Function (NRF)
Network Slice Selection Function (NSSF)
Policy Control Function (PCF)
Session Management Function (SMF)
Unified Data Management (UDM)
User Plane Function (UPF)
Application Function (AF)
User Equipment (UE)
(Radio) Access Network ((R)AN)

Although the present disclosure has been described with reference to one or more examples, workers skilled in the art will recognize that changes may be made in form and detail without departing from the scope of the disclosure and/or the appended claims.

The invention claimed is:

1. A determining method for determining a key to secure a communication between a user equipment and an application server, said method comprising:
   the user equipment authenticating with an authentication server of a mobile communication network, a secret master key being generated, during said authenticating, by the user equipment and the authentication server;
   after the secret master key is generated by the user equipment and the authentication server, sending by the user equipment to the authentication server, a key request with a view to communicating with the application server; and
   computing said key by using a key derivation function applied to at least a random variable, a user identifier and an identifier of the application server and using the master key, said random variable having been received by the user equipment from the authentication server after sending the key request to the authentication server.

2. The determining method as claimed in claim 1, wherein said authenticating is triggered during registration of the user equipment with the mobile communication network.

3. The determining method as claimed in claim 1, further comprising:
   the user equipment sending, to the application server, an access request; and
   the user equipment receiving, from the application server, a proof prepared by the authentication server and intended for the user equipment, whether or not the key request is sent depending on a verification of said proof by the user equipment.

4. The determining method as claimed in claim 1, wherein the random variable is unrelated to any random variable used during the authenticating.

5. The determining method as claimed in claim 3, further comprising the user equipment establishing a secure communication with the application server using the computed key.

6. A determining method for determining a key to secure a communication between a user equipment and an application server, said method comprising:
   authenticating the user equipment by an authentication server a mobile communication network, a secret master key being generated, during said authenticating, by the user equipment and the authentication server;
   after the secret master key is generated by the user equipment and the authentication server, receiving by the authentication server a key request that was sent by the user equipment with a view to communicating with the application server;
   sending a random variable by the authentication server to the user equipment after receiving the key request from the user equipment; and
   computing said key by using a key derivation function applied to at least the random variable, a user identifier and an identifier of the application server and using the master key.

7. The determining method as claimed in claim 6, further comprising:
   the authentication server delivering to the application server a prepared proof intended for the user equipment, said proof being intended to be sent, by the application server, to the user equipment in response to an access request sent by the user equipment, whether or not the key request is sent to the authentication server depending on a verification of said proof by the user equipment.

8. The determining method as claimed in claim 6, further comprising:
   the authentication server verifying that the authentication server has computed a key to make a communication between said user equipment and said application server secure, whether or not the random variable is sent to the user equipment depending on said verification.

9. A user equipment, arranged to communicate with an application server via a mobile communication network, said equipment comprising:
   at least one processor; and
   at least one non-transitory computer-readable medium comprising instructions stored thereon which when executed by the at least one processor configure the user equipment to:
   authenticate the user equipment with an authentication server of the mobile communication network, a secret master key being generated, during said authentication, by the user equipment and the authentication server;
   after the secret master key is generated by the user equipment and the authentication server, send, to the authentication server, a key request with a view to communicating with the application server; and
   compute a key to make a communication between the user equipment and the application server secure by using a key derivation function applied to at least a random variable, a user identifier and an identifier of the application server and using the master key, said random variable having been received by the user equipment from the authentication server after sending the key request to the authentication server.

10. An authentication server of a mobile communication network, said authentication server comprising:
- at least one processor; and
- at least one non-transitory computer-readable medium comprising instructions stored thereon which when executed by the at least one processor configure the user equipment to:
- perform an authentication of a user equipment, a secret master key being generated, during said authentication, by the user equipment and the authentication server;
- after the secret master key is generated by the user equipment and the authentication server, receive a key request that was sent by the user equipment with a view to communicating with an application server;
- send a random variable to the user equipment after receiving the key request from the user equipment; and
- compute a key to make a communication between the user equipment and the application server secure, said key being computed by using a key derivation function applied to at least the random variable, a user identifier and an identifier of the application server and using the master key.

11. A non-transitory computer-readable storage medium, on which is stored a program comprising program-code instructions which are executable by a processor of a user equipment arranged to communicate with an application server via a mobile communication network, wherein the instructions configure the user equipment to:
- authenticate the user equipment with an authentication server of the mobile communication network, a secret master key being generated, during said authentication, by the user equipment and the authentication server;
- after the secret master key is generated by the user equipment and the authentication server, send, to the authentication server, a key request with a view to communicating with the application server; and
- compute a key to make a communication between the user equipment and the application server secure by using a key derivation function applied to at least a random variable, a user identifier and an identifier of the application server and using the master key, said random variable having been received by the user equipment from the authentication server after sending the key request to the authentication server.

12. A non-transitory computer-readable storage medium, on which is stored a program comprising program-code instructions which are executable by a processor of an authentication server of a mobile communication network, wherein the instructions configure the an authentication server to:
- perform an authentication of a user equipment, a secret master key being generated, during said authentication, by the user equipment and the authentication server;
- after the secret master key is generated by the user equipment and the authentication server, receive a key request that was sent by the user equipment with a view to communicating with an application server;
- send a random variable to the user equipment after receiving the key request from the user equipment; and
- compute a key to make a communication between the user equipment and the application server secure, said key being computed by using a key derivation function applied to at least the random variable, a user identifier and an identifier of the application server and using the master key.

* * * * *